United States Patent
Salaun

(10) Patent No.: US 9,671,248 B2
(45) Date of Patent: Jun. 6, 2017

(54) METHOD FOR CALIBRATING AN INERTIAL NAVIGATION SYSTEM WITH A LIMITED MECHANICAL TURNING RANGE

(71) Applicant: SAGEM DEFENSE SECURITE, Boulogne Billancourt (FR)

(72) Inventor: Erwan Salaun, Boulogne Billancourt (FR)

(73) Assignee: Sagem Defense Securite, Boulogne Billancourt (FR)

( * ) Notice: Subject to any disclaimer, the term of this patent is extended or adjusted under 35 U.S.C. 154(b) by 139 days.

(21) Appl. No.: 14/648,179

(22) PCT Filed: Nov. 22, 2013

(86) PCT No.: PCT/EP2013/074515
§ 371 (c)(1),
(2) Date: May 28, 2015

(87) PCT Pub. No.: WO2014/082937
PCT Pub. Date: Jun. 5, 2014

(65) Prior Publication Data
US 2015/0308855 A1    Oct. 29, 2015

(30) Foreign Application Priority Data
Nov. 28, 2012 (FR) .................................. 12 03213

(51) Int. Cl.
*G01C 25/00* (2006.01)
*G01C 19/56* (2012.01)

(52) U.S. Cl.
CPC ............. *G01C 25/00* (2013.01); *G01C 19/56* (2013.01); *G01C 25/005* (2013.01)

(58) Field of Classification Search
CPC ....... G01C 19/56; G01C 25/00; G01C 25/005
See application file for complete search history.

(56) References Cited

U.S. PATENT DOCUMENTS 3,304,787 A * 2/1967 Chiku .................... G01C 19/56
                                                      73/514.33
6,498,996 B1 * 12/2002 Vallot .................... G01C 19/56
                                                      702/103
(Continued)

FOREIGN PATENT DOCUMENTS

| EP | 0 392 104 A1 | 10/1990 |
| FR | 2 965 345 A1 | 3/2012 |
| WO | WO 2011/083511 A1 | 7/2011 |

OTHER PUBLICATIONS

Shkel, "Type I and Type II Micromachined Vibratory Gyroscopes," 2006 IEEE/ION Position, Location, and Navigatioin Symposium, 2006, p. 586-593.

*Primary Examiner* — David Bolduc
(74) *Attorney, Agent, or Firm* — Muncy, Geissler, Olds & Lowe, P.C.

(57) ABSTRACT

A method of calibrating an inertial unit having an inertial core with vibratory axisymmetric gyros, the method includes the steps of starting from a first position, causing the inertial core to pivot towards a second position about a pivot axis that is different from the sensing axes of the gyros and from a trisector thereof, while taking measurements of an angular orientation of the vibration of each gyro, the angular orientation being left free during pivoting; returning the inertial core to the first position; adjusting the angular orientation of the vibration of each gyro to a value corresponding to the second position; causing the inertial core to pivot towards the second position while once more taking measurements of the angular orientation of each gyro; and calibrating the inertial core as a function of the measurements taken.

4 Claims, 1 Drawing Sheet

(56) References Cited

U.S. PATENT DOCUMENTS

| | | | | |
|---|---|---|---|---|
| 6,618,683 | B1* | 9/2003 | Berstis | G01C 21/165 340/10.1 |
| 7,066,004 | B1* | 6/2006 | Kohler | G01C 19/5719 702/88 |
| 7,801,694 | B1* | 9/2010 | Watson | G01C 19/56 702/104 |
| 2003/0115930 | A1* | 6/2003 | Kappi | G01C 19/56 73/1.37 |
| 2009/0033329 | A1* | 2/2009 | Stewart | G01C 25/00 324/318 |
| 2009/0158846 | A1* | 6/2009 | Lignon | G01C 19/567 73/504.12 |
| 2010/0161272 | A1* | 6/2010 | Yamashita | G01C 17/38 702/150 |
| 2011/0066395 | A1* | 3/2011 | Judd | G01C 19/56 702/104 |
| 2011/0231144 | A1* | 9/2011 | Kitamura | G01C 17/38 702/141 |
| 2011/0232359 | A1* | 9/2011 | Caron | G01C 19/56 73/1.77 |
| 2011/0259078 | A1* | 10/2011 | Caron | G01C 19/56 73/1.77 |
| 2013/0204565 | A1* | 8/2013 | Rosellini | G01C 25/00 702/92 |

* cited by examiner

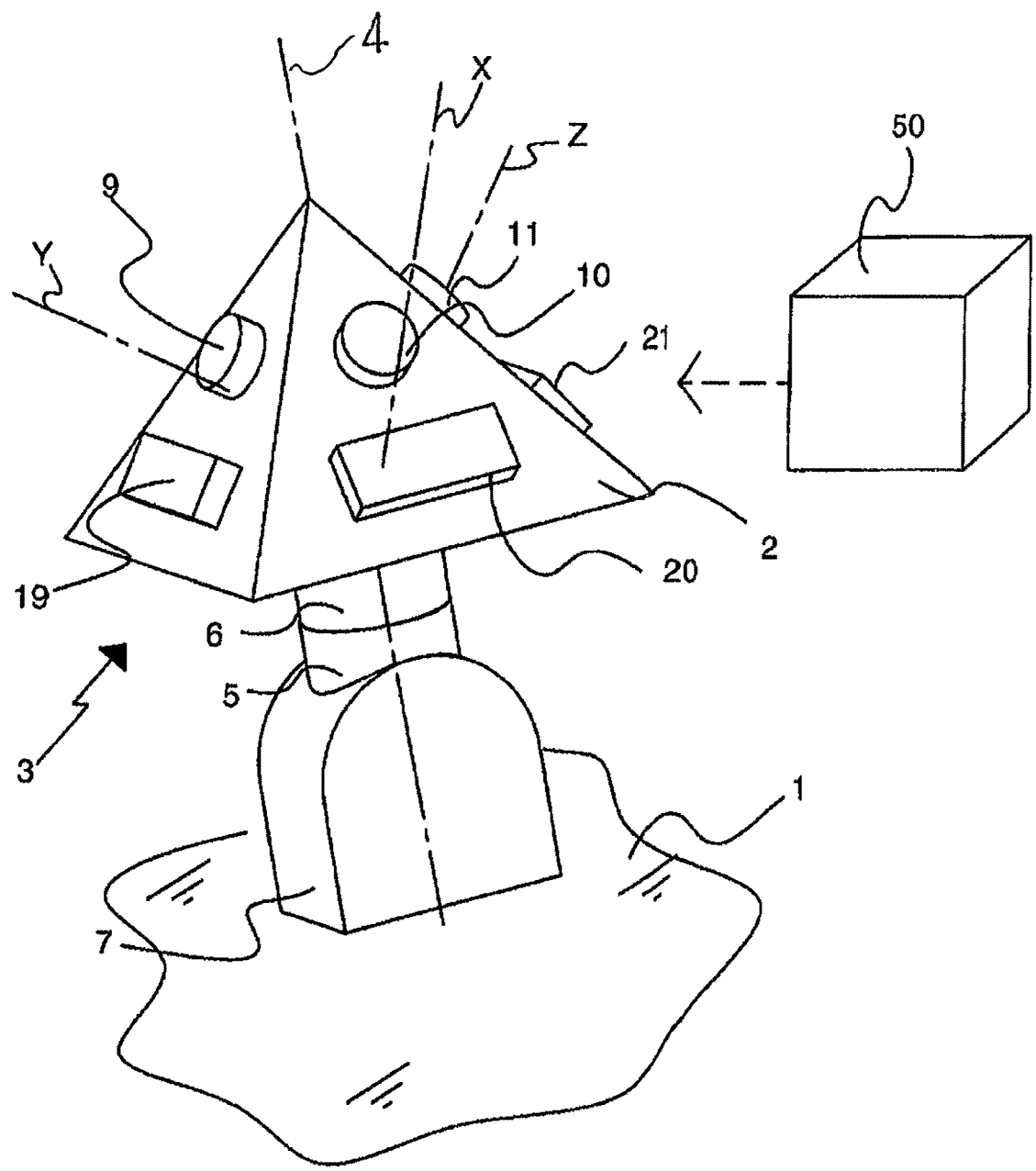

METHOD FOR CALIBRATING AN INERTIAL NAVIGATION SYSTEM WITH A LIMITED MECHANICAL TURNING RANGE

BACKGROUND OF THE INVENTION

Field of the Invention

The present invention relates to a method of calibrating an inertial unit for mounting on a vehicle. The vehicle may be a terrestrial vehicle, an aircraft, or a ship, for which navigation requires knowledge of position, speed, and attitude (heading, roll, and pitching). The invention relates more particularly to inertial units having axisymmetric vibratory gyros.

Description of Related Art

A modern inertial navigation unit generally has an inertial core. The inertial core comprises inertial sensors such as gyros and accelerometers arranged on the axes of the measurement reference frame. The gyros measure angular rotations of the measurement reference frame relative to an inertial frame of reference and they provide the attitude of the vehicle in the geographical frame of reference after applying correction terms that seek, by way of example, to compensate for the rotation of the earth and the movement of the carrier relative to the earth. The accelerometers measure accelerations as projected into the geographical frame of reference, which accelerations are then integrated a first time to provide speed, and a second time to provide position. The accuracy of an inertial navigation unit depends directly on the errors of the inertial sensors, and more precisely on the projection of these errors onto the local geographic reference frame, and when performing inertial navigation over a long duration, position errors depend mainly on the accuracy of the gyros. The accuracy of the gyros is affected by drift errors (offset in the origin of the measured speed of rotation), by angle coding errors (disturbance of the measured vibration angle), by scale factor errors (a scale factor error is an error concerning a coefficient used for multiplying the measured speed of rotation), and by axis setting errors (orthogonality errors between the measurement axes).

In inertial cores, it is known in particular to make use of vibratory resonator gyros. Vibratory gyros are axisymmetric and make use of the Coriolis effect (also known as "Coriolis vibratory gyroscopes (CVG)), e.g. having a hemispherical resonator (known as a "hemispherical resonance gyroscopes" (HRG)), and more generally they are said to be type I as in the document "Type I and type II micromachined vibratory gyroscopes", by Andrei M. Shkel, pp. 586-593, IEEE/ION ("Institute of Electrical and Electronics Engineers/Institute of Navigation") PLANS 2006, San Diego, Calif., USA. Such gyros operate either in an open loop, in which case they serve to measure an absolute angle of rotation on the basis of measuring an angle representing the position of the vibration of the resonator relative to measurement electrodes (electrical angle), or else in a closed loop, in which case they serve to measure a speed of rotation on the basis of measuring the current needed to maintain the electrical angle at a given value. The measurements supplied by such vibratory gyros may suffer from errors or instabilities that are essentially a function of the position of the vibration relative to the measurement electrodes. Such errors therefore vary depending on the position of the vibration as represented by the electrical angle.

These errors are generally determined during a calibration operation that is performed in the factory, and then they are stored so as to be taken into account when performing measurements during subsequent operation of the gyros.

Nevertheless, in certain applications, inertial units may be stored for relatively long periods of time, typically several months, prior to being installed in a vehicle where they are to be used immediately after being installed. Unfortunately, errors change during storage, thereby making it necessary to perform new calibration between installing and using inertial units.

Calibration may be performed by physically pivoting the inertial core about a plurality of non-coinciding axes. That requires the inertial core to be mounted on a multiaxis turning device prior to installing the core and the device on a vehicle.

Nevertheless, a multiaxis turning device presents overall size and weight that are not compatible with certain vehicles of small dimensions. Under such circumstances, the calibration operation is performed prior to installing the inertial core in the vehicle, which means that it is not possible to perform calibration immediately prior to using the vehicle. The validity of the calibration performed then depends amongst other things on the time that has elapsed between calibration and the vehicle being used.

BRIEF SUMMARY OF THE INVENTION

An object of the invention is to provide calibration means enabling the accuracy of inertial units to be improved.

To this end, the invention provides a method of calibrating an inertial unit comprising an inertial core having three gyros mounted relative to one another so as to have sensing axes that are substantially mutually perpendicular, the gyros being vibratory axisymmetric gyros connected to means for setting them into vibration and for adjusting an angular orientation of a vibration axis about the sensing axis. The method comprises the steps of:

starting from a first position, causing the inertial core to pivot towards a second position about a pivot axis that is not in alignment with the sensing axes and that is not in alignment with a trisector of said sensing axes;

between the first and second positions, taking measurements of the angular orientation of the vibration axis of each gyro, with the angular orientation being left free;

returning the inertial core to the first position;

adjusting the angular orientation of the vibration axis of each gyro to a value corresponding to the second position;

causing the inertial core to pivot towards the second position about the pivot axis;

between the first and second positions, taking measurements of the angular orientation of the vibration axis of each gyro, while the angular orientation is left free; and calibrating the inertial core as a function of the measurements taken.

Thus, the vibrations of the gyros turn because the inertial core is pivoted. Since the angle codings and the drifts are mainly sinusoidal functions of the electrical angle (or of one of its multiples), it is possible during the pivoting or during static pauses, to determine a large portion of the angle coding errors and of the gyro drifts as projected onto the pivot axis, and thus to eliminate them. The angle codings and the drifts of each of the gyros vary sinusoidally at a frequency that depends on the angle between the sensing axis (or measurement axis) of each of said gyros and the pivot axis. In addition, because the turning axis is not colinear with the sensing axes of the gyros, there is a multiplicative ratio between the physical pivoting angle and the change that results from the physical pivoting in the value of the angular orientation of the vibration axis. For example, pivoting the inertial core through 270° about the pivot axis gives rise to a change of 90° in the angular orientation of the vibration axis. However, for calibration to be as effective as possible, it is necessary for the change to the total angular orientation of the vibration axis to be as great as possible, and if possible for it to exceed 180°. Alternating between physical pivoting and adjusting angular orientation makes it possible to add the change in the angular orientation that results from the first pivoting movement to the change in the angular orientation that results from the second pivoting movement. This makes it possible to improve the performance of inertial units at a cost that is relatively low, and this is particularly advantageous with low-cost inertial units.

Preferably, alternating between pivoting and adjusting electrical angle is continued until the electrical angle has a value equal to 360°.

This makes it possible to obtain the most effective calibration.

Other characteristics and advantages of the invention appear on reading the following description of a particular non-limiting implementation of the invention.

BRIEF DESCRIPTION OF THE DRAWING

Reference is made to the sole accompanying FIGURE, which is a diagrammatic perspective view of an inertial unit enabling the method of the invention to be performed.

DETAILED DESCRIPTION OF THE INVENTION

With reference to the FIGURE, the inertial unit of the invention has a platform 1 enabling the inertial unit to be secured to a vehicle. The platform 1 supports a carrousel 2 carrying an inertial core 3 associated with a reference frame having three axes X, Y, and Z. The inertial unit is arranged to determine the orientation of this reference frame relative to three axes of a stationary inertial reference frame that may have any origin, e.g. the center of the earth as in this example. Two of the axes of the inertial frame of reference are oriented in a plane that is substantially horizontal, and the third axis is oriented substantially vertically upwards.

The inertial core 3 has three gyros 9, 10, and 11 and three accelerometers 19, 20, and 21. The gyros 9, 10, 11 are axisymmetric vibratory gyros, each comprising a hemispherical resonator that is maintained in vibration. Under the effect of the vibration, the circular edge of the resonator deforms into an ellipse having a major axis and a minor axis that are perpendicular to the polar axis of the resonator. An angle measurement may be performed by detecting an angular orientation of one of these characteristic axes (or vibration axis) about the polar axis of the resonator (electrical angle). The resonator in this example is hemispherical (a gyro of the HRG type) but it could be of some other shape (e.g. a column gyro).

The accelerometer 19 measures the accelerations of the inertial core 3 in the direction of the Y axis and the gyro 9 measures rotations of the inertial core 3 about the Y axis. The accelerometer 20 measures accelerations of the inertial core 3 in the direction of the X axis and the gyro 10 measures rotations of the inertial core 3 about the X axis. The accelerometer 21 measures accelerations of the inertial core 3 in the direction of the Z axis and the gyro 11 measures rotations of the inertial core 3 about the Z axis. It is then possible to calculate the accelerations of the vehicle along each of the axes of the inertial frame of reference, by deducing the measured accelerations and then to calculate the speed of the vehicle by first integration and then the position of the vehicle in the inertial frame of reference by second integration.

The carrousel 2 is mounted on the platform 1 to pivot about a pivot axis 4. For this purpose, the carrousel 2 is secured to a pin suspended on magnetic bearings in order to limit friction. A motor 5 enables the carrousel 2 to be pivoted. The pivot axis 4 is not in alignment with the sensing axes of the gyros and in this example it is distinct from a trisector of the sensing axes (X, Y, Z). More precisely, the pivot axis 4 is such that the gyros 9, 10, and 11 have errors that appear at frequencies that are not identical, the frequencies at which the errors of the gyros appear not being harmonics of one another. In this example, the pivot axis 4 forms an angle of about 35° to 40° with the trisector of the sensing axes.

A coder 6 is mounted on the platform 1 to detect the angular position of the pin.

The navigation device has a control unit, shown diagrammatically at 50, that is programmed to control the inertial core 3 and to perform the method of the invention.

The control unit 50 is connected to the inertial sensors, to the coder 6, and to the motor 5 for pivoting the carrousel 2 in order to control them. In conventional manner, the control unit 50 is connected to electrostatic transducers forming actuators and detectors associated with the resonators in order to form means for setting the resonators into vibration and for adjusting an angular orientation of an axis of the vibration about the sensing axis. The angular orientation of the axis of the vibration about the sensing axis is adjusted by a so-called "precession" command.

The control unit 50 is arranged to drive the carrousel with reciprocating pivoting motion.

The control unit 50 is also programmed to take angle measurements by means of the gyros 9, 10, and 11 and acceleration measurements by means of the accelerometers 19, 20, and 21 during pivoting of the carrousel 2.

More precisely, the method performed by the control unit 50 comprises the following steps:

starting from a first position, pivoting the inertial core 3 towards a second position about a pivot axis that is not in alignment with the sensing axes nor with a trisector of said sensing axes;

between the first and second positions, taking measurements of the angular orientation of the vibration axis of each gyro 9, 10, and 11, the angular orientation being left free;

returning the inertial core to the first position;

adjusting the angular orientation of the vibration axis of each gyro to a value corresponding to the second position;

causing the inertial core 3 to pivot towards the second position about the pivot axis 4;

between the first and second positions taking measurements of the angular orientation of the vibration axis of each gyro 9, 10, and 11, the angular orientation being left free; and calibrating the inertial core as a function of the measurements taken.

This alternation between pivoting and setting the electrical angle is performed until the electrical angle has a value equal to at least 180°.

Since the orientation of the pivot axis 4 relative to the gyros 9, 10, and 11 is selected so that the gyros 9, 10, and 11 have errors that appear at frequencies that are not identical, and since the frequencies at which the errors of the gyros 9, 10, and 11 appear are not harmonics of one another, it is possible to perform a calibration stage that is particularly effective, during which stage the gyros 9, 10, and 11 that are responsible for errors are identified as a function of the frequencies at which the errors appear. Each detected error is thus associated with the corresponding gyro 9, 10, or 11. The measurements coming from each gyro 9, 10, and 11 can thus be corrected in order to improve the accuracy of the inertial unit.

When calibration is performed while the vehicle is in motion, between the first and second positions, measurements are taken of the angular orientation of the vibration axis of each gyro and acceleration measurements are taken by means of the accelerometers. The acceleration measurements make it possible to determine the drifts that drive the speed or position errors. In order to do this, the measurements taken with the accelerometers and the gyros are compared with reference speeds or positions in order to observe the operating parameters of the gyros.

During calibration, the vehicle may be stationary and the carrousel 2 may be positioned so that the pivot axis 4 coincides with a vertical axis. Any errors that arise can then be compensated more easily, since in theory no motion should be detected in the horizontal plane.

During calibration, the vehicle may also be in motion. If this motion is measured by some other means (loch, GPS, . . . ), it is also possible to compensate for the errors that appear in the horizontal plane.

During navigation it is possible:
  to pivot the carrousel 2 about the pivot axis 4; and
  to take measurements with each of the gyros 9, 10, and 11 while the carrousel 2 is pivoting.

The pivoting frequency is selected to enable gyro errors to be averaged over a time horizon, i.e. to a minimum for the spectral density of errors of the gyros 9, 10, and 11.

It can be understood that while navigating, pivoting the carrousel 2 makes it possible to average the errors of the gyros 9, 10, and 11, providing the selected pivoting frequency is higher than the dynamic range of the carrier (e.g. at least three times higher). Averaging the projection of the drifts of each of the gyros on the pivot axis takes place at the frequency corresponding to one revolution of their respective electrical angles. Averaging of the drift of each of the gyros in the plane perpendicular to the pivot axis takes place at a frequency that is both a sub-multiple of the frequencies at which the electrical angles of each of the gyroscopes vary and a sub-multiple of the frequency of the pivot axis.

In a variant, the carrousel 2 may also be positioned in the vehicle so that the pivot axis is substantially horizontal when the vehicle is on the ground. While navigating, this position of the pivot axis is advantageous since pivoting the carrousel 2 then has no effect on determining heading, thus making it pointless to have a very accurate coder 6 for detecting the pivot angles of the gyros 9, 10, and 11 relative to the vehicle.

Reciprocating rotary motion serves to eliminate errors due to scale factor. From this point of view, reciprocating pivoting motion is more advantageous than continuous pivoting motion since it avoids putting constraints on the quality of the scale factor of the trihedron of gyros. In contrast, there is a risk that the pivoting motion of the carrousel 2 might correspond to the motion of the carrier vehicle. This risk vanishes if care is taken to cause the pivoting motion to operate in a dynamic range that is higher than the dynamic range of motion of the carrier (e.g. by a factor of at least 3). It may be observed that the measurement operations performed by the gyros 9, 10, and 11 may either be continuous or else repeated.

Naturally, the invention is not limited to the implementations described but covers any variant coming within the ambit of the invention as defined by the claims.

In particular, it is possible to select a different orientation for the pivot axis 4. For example, while navigating, it may be chosen to orient the pivot axis 4 vertically. It would then be preferable to compensate for heading errors due to scale factor by using some other navigation system, such as a satellite positioning system of the GPS type. It would also be preferable to impart reciprocating pivoting motion to the carrousel 2.

The inertial unit need not include accelerometers, e.g. when it is for use on board a satellite.

In a variant, the gyros and the accelerometers need not be in alignment. More precisely, one accelerometer may be in alignment with the turning axis and the other two accelerometers may be orthogonal thereto. There is thus misalignment between the trihedron formed by the accelerometers and the trihedron formed by the gyros. This makes it easy to calibrate two of the three accelerometers.

Also in a variant, one or more pauses may be provided between the first and second positions, during which pauses the pivoting of the core is interrupted while measurements continue to be taken.

In another variant implementation, the carrousel 2 may be associated with means enabling the pivot axis of the carrousel to be positioned in two orientations depending on whether the inertial unit is being calibrated or is being used for navigating.

The invention claimed is:

1. A method of calibrating an inertial unit comprising an inertial core having three gyros mounted relative to one another so as to have sensing axes that are substantially mutually perpendicular, the gyros being vibratory axisymmetric gyros connected to actuators for setting them into vibration and detectors for adjusting an angular orientation of a vibration axis about the sensing axis, the method comprising the steps of:
  starting from a first position, causing the inertial core to pivot towards a second position about a pivot axis that is not in alignment with the sensing axes and that is not in alignment with a trisector of said sensing axes;
  between the first and second positions, taking measurements of the angular orientation of the vibration axis of each gyro, with the angular orientation being left free;
  returning the inertial core to the first position;
  adjusting the angular orientation of the vibration axis of each gyro to a value corresponding to the second position;
  causing the inertial core to pivot towards the second position about the pivot axis;
  taking measurements of the angular orientation of the vibration axis of each gyro during pivoting of the inertial core, angular orientation being left free during pivoting; and
  calibrating the inertial core by applying correction terms as a function of the measurements taken.

2. The method according to claim 1, wherein pivoting movements, pauses, and adjustments of the electrical angle are alternated until the electrical angle varies during calibration by a value that is greater than 180°.

3. The method according to claim 1, wherein the pivot axis is such that the gyros have errors that appear at frequencies that are not identical, the frequencies at which gyroscope errors appear not being harmonics of one another.

4. The method according to claim 3, wherein the pivot axis is at an angle of about 35° to 40° with the trisector of the sensing axes.

* * * * *